UNITED STATES PATENT OFFICE 2,413,627

PARASITICIDAL COMPOSITIONS

William F. Hester, Drexel Hill, and W E Craig, Philadelphia, Pa., assignors to Röhm & Haas Company, Philadelphia, Pa., a corporation of Delaware No Drawing. Application June 3, 1942,
Serial No. 445,645

6 Claims. (Cl. 167—30)

This invention deals with parasiticidal compositions containing an aminobenzoic acid or a salt thereof as an active principle. More particularly this invention deals with insecticidal and fungicidal sprays and dusts which contain as an active agent a compound of the formula

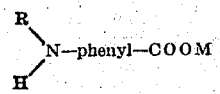

wherein R represents hydrogen, an aliphatic hydrocarbon group, or an acyl group, and M represents hydrogen or a salt-forming cation.

It has been found that the acids and salts of the above type have fungicidal value and also insecticidal value. They are generally useful in combatting and preventing attacks of fungi on living plants without appreciable damage to the host plant and at the same time are of value in destroying various insects. The aminobenzoates may be applied as solutions, suspensions in liquids, or dusts. They may be used as the sole parasiticidal agent or may be used in conjunction with other toxicant, whether fungicide or insecticide. The parasiticidal composition may contain wetting or spreading agents and/or sticking agents or adhesives. If desired, an aminobenzoate may be applied on a solid carrier whether in a spray or a dust.

The aminobenzoic acids and salts which have been found to have parasiticidal action include not only those having a phenyl group substituted with a carboxyl group and an amine or substituted amine group but also those having in addition to the carboxyl and amino substituents a further nuclear substituent of a relatively inert, neutral nature, such as alkyl, aryl, aralkyl, halogeno, acyl, or thiocyano. Such substituents include methyl, ethyl, isopropyl, tert.-butyl, chloro, bromo, acetyl, phenyl, benzyl, methyl benzyl, etc.

As a substituent of the amino group there may be used any acyl group such as acetyl, butyryl, valeryl, lauroyl, etc., or a hydrocarbon group, such as methyl, propyl, allyl, methallyl, butyl, benzyl, or the like. The amine or substituted amine group may occupy a position which is ortho, meta, or para to the carboxyl group. The latter group may be in its acid form or in the form of a salt such as an amine salt (methylamine, dimethylamine, trimethylamine, amyl amine, triethanolamine, ethylene diamine, triethylene tetramine, etc.), a salt of a metal such as lithium, sodium, potassium, calcium, barium, cadmium, lead, copper, silver, iron, zinc, etc., or a salt of a strong organic base, such as a quaternary ammonium salt, including the trimethyl benzyl ammonium salt, diethyl dibenzyl ammonium salt, etc.

The aminobenzoates having substituted amine groups may be prepared by reaction of the amino acids with alkylating agents such as methyl iodide, ethyl sulfate, methallyl chloride, benzyl chloride, etc. or with acylating agents such as acetyl chloride, benzoyl chloride, butyryl bromide, lauroyl chloride, etc., or acetic anhydride, benzoic anhydride, butyric anhydride, or other anhydride of a similar carboxylic acid. The acid may be reacted directly with metal hydroxides or oxides to yield a metal salt. Alternatively a soluble salt may be formed and a solution thereof reacted with a solution of a salt of a metal yielding an insoluble aminobenzoate. This is a convenient method for the preparation of aminobenzoates of such metals as cadmium, zinc, silver, copper, barium, etc. The salts of metals of known fungicidal action are particularly effective in fungicidal compositions. The variety of salts which are thus effective, however, makes possible the choice of agents which are most suitable for any given application and makes possible the avoidance in any given case of the use of a metal toward which a given plant may be sensitive.

In the testing of aminobenzoates for fungicidal action plates were coated with cellulose acetate, then sprayed with solutions or suspensions of various aminobenzoates and dried. The plates were then inoculated with spores of *Macrosporium sarcinaeforme* and incubated. The germination or lack of germination of the spores was then observed. The aminobenzoates were also studied for insecticidal value against such pests as Mexican bean beetle larvae on bean plants, and aphids or red spiders on nasturtiums. In making these tests the aminobenzoates were applied in sprays or in dusts and the results determined after a 24 hour interval.

Typical results are described below.

Anthranilic acid was dissolved in alcohol and the solution taken up on talc, which was then dried and ground. A spray containing anthranilic acid at 1% was applied to bean plants infested with Mexican bean beetle larvae. A control of 83% was obtained. This acid showed definite fungicidal action. Its copper salt exhibited increased fungicidal action and a high tenacity on foliage.

Similar tests were made with 2-amino-5-chloroanthranilic acid which gave a 100% control of Mexican bean beetle larvae in a 1% spray. The cupric salt of 2-amino-5-thiocyano anthranilic acid, incorporated into a 1% dust with magnesium carbonate gave a 72% control of aphids and was quite effective as a fungicide. Satisfactory tests were likewise obtained with the zinc, the ferrous, and the ferric salts of the last named acid.

By reaction of acetic anhydride and 2-amino-5-chloro-anthranilic acid there was obtained the corresponding 2-acetamino derivative. The sodium salt was prepared by neutralization of the acid with sodium hydroxide. A solution of this salt was treated wtih an equivalent amount of copper sulfate in aqueous solution to yield the copper salt. Both acid and salts were found to be fungicidally active. Sprays containing 1% of these agents gave controls of 99% against bean beetle larvae.

The benzoyl derivative of anthranilic acid was prepared and found to be active both fungicidally and insecticidally. Anthranilic acid was also reacted with benzyl chloride to yield the N-benzyl derivative. The copper salt of this compound was very active fungicidally.

An analogous compound, N-methallyl anthranilic acid proved to be fungicidally active and gave a 90% control against bean beetle larvae at ½%.

A compound of the general composition $$C_nH_{2n+1}CONHC_6H_4COOH—2$$

was prepared using commercial fatty acids, in which $n$ has an average value of about 12, as the source of the acyl groups. This compound diluted 1:1600 in a spray gave a control of aphids of 73%.

The meta-acetaminobenzoic acid was prepared and tested as a stomach poison against bean beetle larvae with a control of 56% from a spray having a 1% concentration of this toxicant. The copper salt of this compound was particularly fungicidal. The comparable para acid and salt were also prepared and tested. They were somewhat more active, giving a control of 63% against bean beetle larvae. The fungicidal activity of para-aminobenzoic acid was also established by test.

Another type of product tested and found insecticidally active was $$ClCH_2CONHC_6H_4COOH—2$$

The salts of this acid were also effective.

Acetanthranilic acid was prepared and sodium, copper, iron, zinc, cadmium, etc., salts formed therefrom. Powdery mildew on snapdragons was controlled with a spray having 2 lbs. of the acid in 100 gallons of solution. Powdery mildew on roses was controlled with sprays containing one-half and one pound respectively per 100 gallons of the copper salt. Barium and iron salts were also tested and found fungicidally and insecticidally active. In preventing damping off of seeds the acetanthranilates were found particularly effective.

The aminobenzoates may be used as the sole parasiticidal agent or they may be used in conjunction with other insecticides and other fungicides, such as nicotine, pyrethrum, rotenone, thiocyanates, cuprous oxide, copper oxychloride, basic copper sulfate, etc.

The species relating to acetanthranilic acid has already been disclosed and claimed as a fungicidal agent in U. S. Serial No. 404,970, filed August 1, 1941, now U. S. Patent 2,297,557, issued September 29, 1942, and the present application is a continuation-in-part thereof insofar as common subject matter is involved. There are claimed herein broadly parasiticidal compositions based on aminobenzoates and specifically the meta- and para-aminobenzoates.

We claim:

1. A parasiticidal composition containing as the sole fungicidal and insecticidal agent a compound of the formula

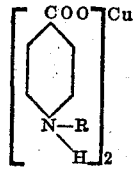

wherein R is an acyl group and a carrier therefor.

2. A parasiticidal composition containing as the sole fungicidal and insecticidal agent a compound of the formula

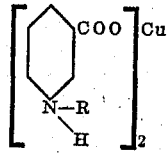

wherein R is an acyl group and a carrier therefor.

3. A parasiticidal composition containing as the sole fungicidal and insecticidal agent copper m-acetoaminobenzoate and a carrier therefor.

4. A parasiticidal composition containing as the sole fungicidal and insecticidal agent copper p-acetoaminobenzoate and a carrier therefor.

5. A parasiticidal composition containing as the sole fungicidal and insecticidal agent a metal salt of an N-acylated amino acid selected from meta-aminobenzoic acid and para-aminobenzoic acid and a carrier therefor.

6. A parasiticidal composition containing as the sole fungicidal and insecticidal agent the copper salt of an N-acylated amino acid selected from meta-aminobenzoic acid and para-aminobenzoic acid and a carrier therefor.

WILLIAM F. HESTER.
W E CRAIG.